US008593062B2

(12) United States Patent
Murphy et al.

(10) Patent No.: US 8,593,062 B2
(45) Date of Patent: Nov. 26, 2013

(54) COLOR STABLE PHOSPHORS FOR LED LAMPS AND METHODS FOR PREPARING THEM

(75) Inventors: James Edward Murphy, Niskayuna, NY (US); Anant Achyut Setlur, Niskayuna, NY (US); Samuel Joseph Camardello, Albany, NY (US)

(73) Assignee: General Electric Company, Niskayuna, NY (US)

( * ) Notice: Subject to any disclaimer, the term of this patent is extended or adjusted under 35 U.S.C. 154(b) by 309 days.

(21) Appl. No.: 13/080,099

(22) Filed: Apr. 5, 2011

(65) Prior Publication Data
US 2011/0279011 A1  Nov. 17, 2011

Related U.S. Application Data

(60) Provisional application No. 61/329,368, filed on Apr. 29, 2010.

(51) Int. Cl.
*H05B 33/00* (2006.01)
*H01J 1/62* (2006.01)

(52) U.S. Cl.
USPC ............. 313/512; 313/483; 252/301.4 H

(58) Field of Classification Search
USPC ......... 313/483, 503, 468, 567, 467, 571, 512; 252/301.4 H, 301.6 R; 362/231; 445/23–25
See application file for complete search history.

(56) References Cited

U.S. PATENT DOCUMENTS

| 6,426,589 | B1 | 7/2002 | Jüstel et al. |
| 6,734,466 | B2 | 5/2004 | Chua |
| 7,202,598 | B2 | 4/2007 | Juestel et al. |
| 2002/0105266 | A1 | 8/2002 | Juestel et al. |
| 2007/0125982 | A1 | 6/2007 | Tian et al. |
| 2008/0003160 | A1 | 1/2008 | Kim et al. |
| 2010/0177513 | A1* | 7/2010 | Radkov et al. ............. 362/231 |

FOREIGN PATENT DOCUMENTS

| EP | 1560274 A1 | 8/2005 |
| EP | 2180032 A2 | 4/2010 |

OTHER PUBLICATIONS

Search Report and Written Opinion from corresponding PCT Application No. PCT/US2011/032619 mailed on Jun. 30, 2011.
Jean et al., "Y2O2S:Eu Red Phosphor Powders Coated With Silica", J. Am. Ceram. Soc., vol. 83, No. 8, pp. 1928-1934, 2000.
Li et al., "Surface Modification of SrAl2O4:Eu2+, Dy3+ Phosphors Using Silica Encapsulation", Advanced Materials Research, vol. 58, pp. 199-204, 2009.

* cited by examiner

*Primary Examiner* — Joseph L Williams
(74) *Attorney, Agent, or Firm* — Mary Louise Stanford

(57) ABSTRACT

An LED lamp includes a light source configured to emit radiation with a peak intensity at a wavelength between about 250 nm and about 550 nm; and a phosphor composition configured to be radiationally coupled to the light source. The phosphor composition includes particles of a phosphor of formula I, said particles having a coating composition disposed on surfaces thereof;

$$((Sr_{1-z}M_z)_{1-(x+w)}A_wCe_x)_3(Al_{1-y}Si_y)O_{4+y+3(x-w)}F_{1-y-3(x-w)} \quad \quad I$$

wherein the coating composition comprises a material selected from aluminum oxide, magnesium oxide, calcium oxide, barium oxide, strontium oxide, zinc oxide, aluminum hydroxide, magnesium hydroxide, calcium hydroxide, barium hydroxide, strontium hydroxide, zinc hydroxide, aluminum phosphate, magnesium phosphate, calcium phosphate, barium phosphate, strontium phosphate, and combinations thereof; and
A is Li, Na, K, or Rb, or a combination thereof;
M is Ca, Ba, Mg, Zn, or a combination thereof; and
$0<x\leq0.10$, $0\leq y\leq0.5$, $0\leq z\leq0.5$, $0\leq x\leq x$.

24 Claims, 1 Drawing Sheet

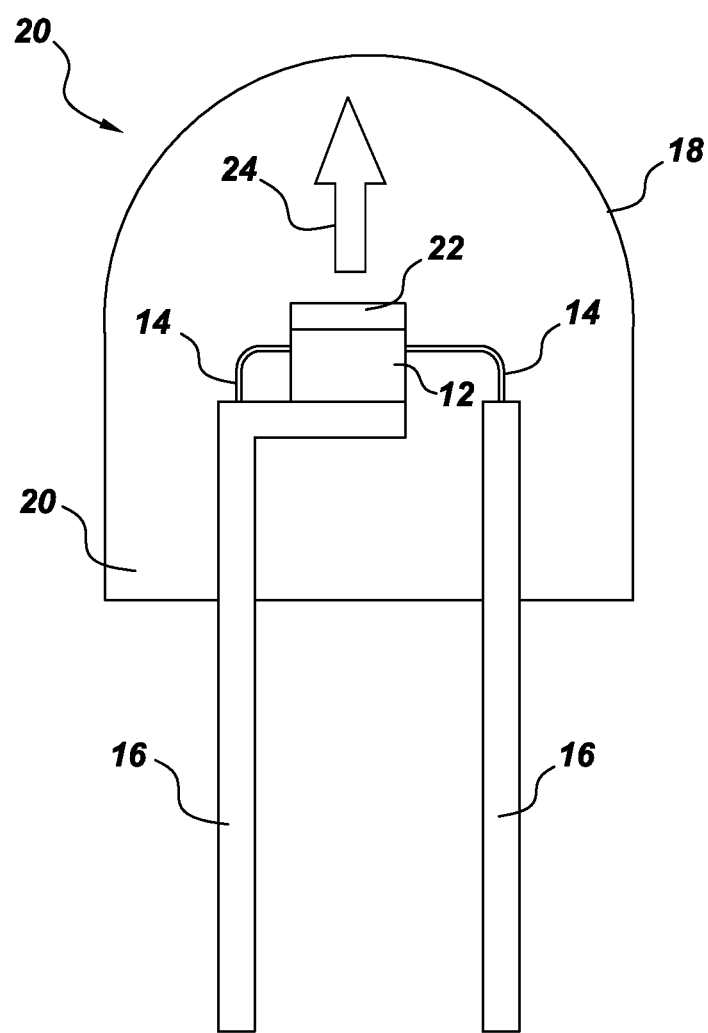

COLOR STABLE PHOSPHORS FOR LED LAMPS AND METHODS FOR PREPARING THEM

CROSS REFERENCE TO RELATED APPLICATIONS

This application claims the priority and benefit of U.S. Provisional Application No. 61/329,368, entitled "COLOR STABLE PHOSPHORS" filed on Apr. 29, 2010, which is incorporated in its entirety herein by reference.

STATEMENT REGARDING FEDERALLY SPONSORED RESEARCH AND DEVELOPMENT

This invention was made with Government support under contract number DE-FC26-06NT42934 awarded by the U.S. Department of Energy. The Government has certain rights in the invention.

BACKGROUND

Solid state lighting based on phosphor downconversion of InGaN LEDs have have begun to replace traditional fluorescent and incandescent lamps. These colored semiconductor light emitting devices, including light emitting diodes and lasers (both are generally referred to herein as LEDs), have been also produced from Group III-V alloys such as gallium nitride (GaN). Light emitted from InGaN-based LEDs is generally in the UV and/or blue range of the electromagnetic spectrum. Light emitted from the LED is converted to light that is useful for illumination purposes by coating or covering the LED with a phosphor layer. By interposing a phosphor excited by the radiation generated by the LED, light of a different wavelength, e.g., in the visible range of the spectrum, may be generated. Colored phosphors produce custom colors and higher luminosity, and, in combination with LED generated light, phosphor generated light may be used to produce white light. The most popular white LEDs are based on blue emitting InGaN chips. The blue emitting chips are coated with a phosphor or blend of phosphors that converts some of the blue radiation to a complementary color, e.g. a yellow-green emission. LEDs that emit in the near UV region (405 nm) are coated with a phosphor blend that includes a blue or blue green phosphor and a red emitter. The total of the light from the phosphor and the LED chip provides a color point with corresponding color coordinates (x and y) and correlated color temperature (CCT), and its spectral distribution provides a color rendering capability, measured by the color rendering index (CRI).

The production of light from LEDs and other light sources typically generates heat as a byproduct. Phosphors exposed to higher temperatures may have decreased quantum efficiency. As the quantum efficiency of different phosphors changes at different rates as temperature increases, the light emitted by the device may dim or the color may shift as the device enters steady state operation. In addition, some phosphors undergo hydrolysis reactions at an appreciable rate under conditions of elevated temperature and humidity. Thus, there is a continued demand for stable phosphor compositions that may be used as components, individually or as part of a phosphor blend, in the manufacture of LEDs and other light sources. Such phosphor compositions would allow a wider array of light sources with desirable properties including good color quality (CRI>80), a large range of color temperatures, and a relative insensitivity to temperature changes.

BRIEF DESCRIPTION

Briefly, in one aspect, the present invention relates to a color stable phosphor composition including particles of a phosphor of formula I, the particles having a coating composition disposed on surfaces thereof.

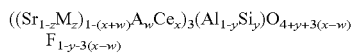
$$((Sr_{1-z}M_z)_{1-(x+w)}A_w Ce_x)_3 (Al_{1-y}Si_y)O_{4+y+3(x-w)}F_{1-y-3(x-w)} \quad I$$

wherein the coating composition includes a material selected from aluminum oxide, magnesium oxide, calcium oxide, barium oxide, strontium oxide, zinc oxide, aluminum hydroxide, magnesium hydroxide, calcium hydroxide, barium hydroxide, strontium hydroxide, zinc hydroxide, aluminum phosphate, magnesium phosphate, calcium phosphate, barium phosphate, strontium phosphate, and combinations thereof; and A is Li, Na, K, or Rb, or a combination thereof;
M is Ca, Ba, Mg, Zn, or a combination thereof; and
$0<x\leq 0.10$, $0\leq y\leq 0.5$, $0\leq z\leq 0.5$, $0\leq w\leq x$.

In another aspect, the present invention relates to methods for preparing a color stable phosphor. The methods include contacting a phosphor of formula I in particulate form with a coating precursor at an acidic or basic pH in a solvent comprising water. The coating precursor is selected from tetraalkylothosilicates, fumed silica, alkali metal silicates, phosphates of formula $R_n(PO_4)_m$, and combinations thereof, wherein R is hydrogen, $NH_4$, Li, Na, K, Rb, or a combination thereof. When the coating precursor is fumed silica, pH is less than or equal to about 3.

Phosphors of formula I are described in U.S. application Ser. No. 12/256,142, filed on Oct. 22, 2008, and assigned to the General Electric Company, the entire contents of which are incorporated by reference. In another aspect, the present invention relates to color stable phosphors produced according to the method.

The color stable phosphors derived from phosphors of formula I may be blended with other blue, yellow, orange, and red phosphors to yield white light phosphor blends with correlated color temperature (CCTs) in the range of 2500-10000K and CRIs in the range of 50-99. Accordingly, in another aspect, the present invention relates to blends of phosphors produced by the claimed methods.

In yet another aspect, the present invention relates to a lighting apparatus capable of emitting white light. The lighting apparatus includes a semiconductor light source; and a phosphor composition radiationally coupled to the light source, and containing a coated phosphor derived from a phosphor of formula I.

DRAWINGS

These and other features, aspects, and advantages of the present invention will become better understood when the following detailed description is read with reference to the accompanying drawings in which like characters represent like parts throughout the drawings, wherein:

FIG. 1 is a schematic cross-sectional view of a lighting apparatus according to the present invention.

DETAILED DESCRIPTION

With reference to FIG. 1, a lighting apparatus or light emitting assembly or lamp 10 is shown in accordance with one embodiment of the present invention. Lighting apparatus 10 comprises a semiconductor UV radiation source, such as a light emitting diode (LED) chip 12 and leads 14 electrically attached to the LED chip. The leads 14 may comprise thin wires supported by a thicker lead frame(s) 16 or the leads may comprise self supported electrodes and the lead frame may be omitted. The leads 14 provide current to the LED chip 12 and thus cause the LED chip 12 to emit radiation.

The lamp may include any semiconductor blue or UV light source that is capable of producing white light when its emitted radiation is directed onto the phosphor. In one embodiment, the semiconductor light source comprises a blue emitting LED doped with various impurities. Thus, the LED may comprise a semiconductor diode based on any suitable III-V, II-VI or IV-IV semiconductor layers and having an emission wavelength of about 250 to 550 nm. In particular, the LED may contain at least one semiconductor layer comprising GaN, ZnSe or SiC. For example, the LED may comprise a nitride compound semiconductor represented by the formula $In_iGa_jAl_kN$ (where $0 \leq i$; $0 \leq j$, $0 \leq k$ and $i+j+k=1$) having an emission wavelength greater than about 250 nm and less than about 550 nm. Preferably, the chip is a near-uv or blue emitting LED having a peak emission wavelength from about 400 to about 500 nm. Such LED semiconductors are known in the art. The radiation source is described herein as an LED for convenience. However, as used herein, the term is meant to encompass all semiconductor radiation sources including, e.g., semiconductor laser diodes.

Although the general discussion of the exemplary structures of the invention discussed herein are directed toward inorganic LED based light sources, it should be understood that the LED chip may be replaced by another radiation source unless otherwise noted and that any reference to LED chip or semiconductor is merely representative of any appropriate radiation source.

The LED chip 12 may be encapsulated within a shell 18, which encloses the LED chip and an encapsulant material 20. The shell 18 may be, for example, glass or plastic. Preferably, the LED 12 is substantially centered in the encapsulant 20. The encapsulant 20 is preferably an epoxy, plastic, low temperature glass, polymer, thermoplastic, thermoset material, resin or other type of LED encapsulating material as is known in the art. Optionally, the encapsulant 20 is a spin-on glass or some other high index of refraction material. Preferably, the encapsulant material 20 is an epoxy or a polymer material, such as silicone. Both the shell 18 and the encapsulant 20 are preferably transparent or substantially optically transmissive with respect to the wavelength of light produced by the LED chip 12 and a phosphor composition 22 (described below). Alternately, the lamp may 10 may only comprise an encapsulant material without an outer shell 18. The LED chip 12 may be supported, for example, by the lead frame 16, by the self supporting electrodes, the bottom of the shell 18, or by a pedestal (not shown) mounted to the shell or to the lead frame. In some embodiments, the LED chip 12 is mounted in a reflective cup (not shown). The cup may be made from or coated with a reflective material, such as alumina, titania, or other dielectric powder known in the art. A preferred reflective material is $Al_2O_3$.

Lighting apparatus 10 includes phosphor composition 22, described below, radiationally coupled to the LED chip 12. Radiationally coupled means that the elements are associated with each other so radiation from one is transmitted to the other. Phosphor composition 22 is deposited on the LED 12 by any appropriate method. For example, a water based suspension of the phosphor(s) can be formed, and applied as a phosphor layer to the LED surface. In one such method, a silicone slurry in which the phosphor particles are randomly suspended is placed around the LED. This method is merely exemplary of possible positions of the phosphor composition 22 and LED 12. Thus, the phosphor composition 22 may be coated over or directly on the light emitting surface of the LED chip 12 by coating and drying the phosphor suspension over the LED chip 12. Both the shell 18 and the encapsulant 20 should be transparent to allow white light 24 to be transmitted through those elements. Although not intended to be limiting, in one embodiment, the median particle size of the phosphor composition may be from about 1 to about 25 microns, preferably from about 15 to about 20 microns.

In other embodiments, the phosphor composition 22 is interspersed within the encapsulant material 20, instead of being formed directly on the LED chip 12. The phosphor (in the form of a powder) may be interspersed within a single region of the encapsulant material 20 or, more preferably, throughout the entire volume of the encapsulant material. Blue light emitted by the LED chip 12 mixes with the light emitted by the phosphor composition 22, and the mixed light appears as white light. If the phosphor is to be interspersed within the material of encapsulant 20, then a phosphor powder may be added to a polymer precursor, loaded around the LED chip 12, and then the polymer precursor may be cured to solidify the polymer material. Other known phosphor interspersion methods may also be used, such as transfer loading.

In yet another embodiment, phosphor composition 22 is coated onto a surface of the shell 18, instead of being formed over the LED chip 12. The phosphor composition is preferably coated on the inside surface of the shell 18, although the phosphor may be coated on the outside surface of the shell, if desired. The phosphor composition 22 may be coated on the entire surface of the shell or only a top portion of the surface of the shell. The UV/blue light emitted by the LED chip 12 mixes with the light emitted by the phosphor composition 22, and the mixed light appears as white light. Of course, the phosphor may be located in any two or all three locations or in any other suitable location, such as separately from the shell or integrated into the LED.

Phosphor composition 22 includes a coated phosphor, optionally blended with one or more other phosphors. The coated phosphor is a phosphor of formula I which has a coating composition disposed on surfaces of the phosphor particles. In particular embodiments, the phosphor of formula I is $((Sr_{1-z}M_z)_{1-x}Ce_x)_3(Al_{1-y}Si_y)O_{4+y+3x}F_{1-y-3x}$, or $((Sr_{1-z}M_z)_{1-2x}A_xCe_x)_3AlO_4F$. Examples of the phosphor of formula I include, but are not limited to, $(Sr_{0.98}Na_{0.01}Ce_{0.01})_3AlO_4F$; $(Sr_{0.98}Na_{0.01}Ce_{0.01})(Al_{0.9}Si_{0.1})O_{4.1}F_{0.9}$; $(Sr_{0.98}Na_{0.01}Ce_{0.01})(Al_{0.8}Si_{0.2})O_{4.2}F_{0.8}$; $(Sr_{0.75}Ca_{0.23}Na_{0.01}Ce_{0.01})(Al_{0.75}Si_{0.25})O_{4.25}F_{0.75}$, and $(Sr_{0.595}Ca_{0.4}Ce_{0.005})(Al_{0.6}Si_{0.4})O_{4.415}F_{0.585}$, particularly $(Sr_{0.895}Ca_{0.1}Ce_{0.005})_3Al_{0.6}Si_{0.4}O_{4.415}F_{0.585}$.

The coating composition includes a material selected from aluminum oxide, magnesium oxide, calcium oxide, barium oxide, strontium oxide, zinc oxide, aluminum hydroxide, magnesium hydroxide, calcium hydroxide, barium hydroxide, strontium hydroxide, zinc hydroxide, aluminum phosphate, magnesium phosphate, calcium phosphate, barium phosphate, strontium phosphate, and combinations thereof. In particular embodiments, the material of the coating composition is aluminum oxide, aluminum hydroxide, or a combination thereof, magnesium oxide, magnesium hydroxide, or a combination thereof, boron nitride, boron oxide, or a combination thereof, or aluminum phosphate.

In one aspect of the present invention, coated phosphors are prepared by contacting a phosphor of formula I in particulate form with a coating precursor at an acidic or basic pH in a solvent comprising water. The coating precursor is selected from tetraalkylothosilicates, fumed silica, alkali metal silicates, phosphates of formula $R_n(PO_4)_m$, and combinations thereof, wherein R is hydrogen, $NH_4$, Li, Na, K, Rb, or a combination thereof. In particular, the contacting is performed at a pH less than or equal to about 5 or greater than or equal to about 9, except for fumed silica. For example, in embodiments having TEOS as the coating precursor, water and either an acid or base catalyst are used. The reaction is thought to proceed such that 2 moles of water react with 1 mol of TEOS according to the following reaction:

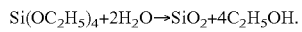
$$Si(OC_2H_5)_4 + 2H_2O \rightarrow SiO_2 + 4C_2H_5OH.$$

Therefore, the solvent should include water, and may additionally include at least one alcoholic solvent. Examples of suitable solvents are methanol, ethanol, propanol, ethylene glycol, propylene glycol, and combinations thereof.

The coating precursor is typically present in an amount corresponding to at least about 5 weight percent based on phosphor weight, preferably in an amount ranging from about 1 to about 15% weight percent based on phosphor weight. However, since an excess of the coating precursor may discarded with the solvent or otherwise washed away, the amount of precursor present in the reaction mixture may vary. Likewise, the temperature at which the phosphor is contacted with the coating precursor may vary. In some embodiments, it may be desirable to maintain the temperature at less than about 60° C., and in others, at less than about 30° C.

When used with an LED emitting at from 350 to 550 nm and one or more other appropriate phosphors, the resulting lighting system will produce a light having a white color, the characteristics of which will be discussed in more detail below. Lamp 10 may also include scattering particles (not shown), which are embedded in the encapsulant material. The scattering particles may comprise, for example, $Al_2O_3$ particles such as alumina powder or $TiO_2$ particles. The scattering particles effectively scatter the coherent light emitted from the LED chip, preferably with a negligible amount of absorption.

The phosphors of formula I may contain optically inert trace impurities. The presence of such impurities in an amount up to 10% by weight of the phosphor composition will not significantly affect the quantum efficiency or color of the phosphor.

It may be desirable to add pigments or filters to the phosphor material. The phosphor layer 22 may also include from 0 up to about 5% by weight (based on the total weight of the phosphors) of a pigment or other UV absorbent material capable of absorbing UV radiation having a wavelength between 250 nm and 450 nm.

Suitable pigments or filters include any of those known in the art that are capable of absorbing radiation generated between 250 nm and 450 nm. Such pigments include, for example, nickel titanate or praseodimium zirconate. The pigment is used in an amount effective to filter 10% to 100% of the radiation generated in the 250 nm to 450 nm range.

Phosphors of formula I may be produced using known solid state reaction methods by combining, for example, elemental oxides, carbonates and/or hydroxides as starting materials. Other starting materials may include nitrates, sulfates, acetates, citrates, or oxalates. Alternately, coprecipitates of the rare earth oxides could be used as the starting materials for the rare earth elements. Thus, according to one method for producing the phosphors of formula I, carbonates may be used as a source for alkali and alkaline earth metals. In a typical process, the starting materials are combined via a dry or wet blending process and fired in air or under a slightly reducing atmosphere at from, e.g., 1000 to 1600° C. In one exemplary process of making the above phosphors, an array slurry method is used. Raw materials (such as $CaCO_3$, $SrCO_3$, $CeO_2$, and $Al_2O_3$) are milled down to micron size powders and then dispersed in water up to 16% by weight solid loading. The slurries may be dispensed into alumina crucibles via a commercial liquid handler under vigorous mixing. The homogenous solid mixture results after water evaporation after firing the slurries at 800-1600° C. under a reducing atmosphere (e.g. 1% $H_2$ in air).

In another typical process, the starting materials are combined via a dry or wet blending process and fired in air or under a reducing atmosphere at from, e.g., 800 to 1600° C. A fluxing agent may be added to the mixture before or during the step of mixing. This fluxing agent may be $AlF_3$, $NH_4Cl$ or any other conventional fluxing agent, such as a fluoride of an alkali/alkaline earth metal. A quantity of a fluxing agent of less than about 20, preferably less than about 10, percent by weight of the total weight of the mixture is adequate for fluxing purposes.

The starting materials may be mixed together by any mechanical method including, but not limited to, stirring or blending in a high-speed blender or a ribbon blender. The starting materials may be combined and pulverized together in a bowl mill, a hammer mill, or a jet mill. The mixing may be carried out by wet milling especially when the mixture of the starting materials is to be made into a solution for subsequent precipitation. If the mixture is wet, it may be dried first before being fired under a reducing atmosphere at a temperature from about 900° C. to about 1700° C., preferably from about 1000° C. to about 1600° C., for a time sufficient to convert all of the mixture to the final composition.

The firing may be conducted in a batchwise or continuous process, preferably with a stirring or mixing action to promote good gas-solid contact. The firing time depends on the quantity of the mixture to be fired, the rate of gas conducted through the firing equipment, and the quality of the gas-solid contact in the firing equipment. Typically, a firing time up to about 10 hours is adequate. The reducing atmosphere typically comprises a reducing gas such as hydrogen, carbon monoxide, or a combination thereof, optionally diluted with an inert gas, such as nitrogen or helium, or a combination thereof. Alternatively, the crucible containing the mixture may be packed in a second closed crucible containing high-purity carbon particles and fired in air so that the carbon particles react with the oxygen present in air, thereby, generating carbon monoxide for providing a reducing atmosphere.

These compounds may be blended and dissolved in a nitric acid solution. The strength of the acid solution is chosen to rapidly dissolve the oxygen-containing compounds and the choice is within the skill of a person skilled in the art. Ammonium hydroxide is then added in increments to the acidic solution. An organic base such as methanolamine, ethanolamine, propanolamine, dimethanolamine, diethanolamine, dipropanolamine, trimethanolamine, triethanolamine, or tripropanolamine may be used in place of ammonium hydroxide.

The precipitate is filtered, washed with deionized water, and dried. The dried precipitate is ball milled or otherwise thoroughly blended and then calcined in air at about 400° C. to about 1600° C. for a sufficient time to ensure a substantially complete dehydration of the starting material. The calcination may be carried out at a constant temperature. Alternatively, the calcination temperature may be ramped from ambient to and held at the final temperature for the duration of the calcination. The calcined material is similarly fired at 1000-1600° C. for a sufficient time under a reducing atmosphere such as $H_2$, CO, or a mixture of one of these gases with an inert gas, or an atmosphere generated by a reaction between a coconut charcoal and the products of the decomposition of the starting materials to covert all of the calcined material to the desired phosphor composition.

The coated phosphors may be blended with one or more additional phosphors for use in LED light sources. Thus, in another embodiment, an LED lighting apparatus is provided including a phosphor composition 22 comprising a blend of a coated phosphor according to the present invention with one or more additional phosphors. When used in a lighting apparatus in combination with a blue or near UV LED emitting radiation in the range of about 250 to 550 nm, the resultant light emitted by the assembly will be a white light. Other phosphors such as green, blue, orange, or other color phosphors may be used in the blend to customize the white color of the resulting light and produce higher CRI sources. When used in conjunction with a LED chip emitting at from, e.g., 250 to 550 nm, the lighting apparatus preferably includes a blue phosphor for converting some, and preferably all, of the LED radiation to blue light, which in turn can then be efficiently converted by the present inventive phosphors. While not intended to be limiting, suitable phosphors for use in the blend with the present invention phosphors include those listed in U.S. Pat. No. 7,274,045 and U.S. Pat. No. 7,094,362, both assigned to the General Electric Company.

The ratio of each of the individual phosphors in the phosphor blend may vary depending on the characteristics of the desired light output. The relative proportions of the individual phosphors in the various embodiment phosphor blends may be adjusted such that when their emissions are blended and employed in an LED lighting device, there is produced visible light of predetermined x and y values on the CIE chromaticity diagram. As stated, a white light is preferably produced. This white light may, for instance, may possess an x value in the range of about 0.30 to about 0.55, and a y value in the range of about 0.30 to about 0.55. As stated, however, the exact identity and amounts of each phosphor in the phosphor composition can be varied according to the needs of the end user.

When combined with a LED emitting at from 350-550 nm and, optionally, one or more additional phosphors, the use of a coated phosphor according to the present invention allows for a white LED device having a higher CRI value and lower CCT as compared to a TAG based lighting device. LED devices having CCT values from about 2500 to about 10000, preferably from 2500 to 4500, and high CRI values from about 70 to 95 can be made. This allows for an increased ccx coordinate and a reduced ccy coordinate on the CIE color chromaticity diagram for the LED device, resulting in a "warmer" color LED.

The phosphor composition described above may be used in additional applications besides LEDs. For example, the material may be used as a phosphor in a fluorescent lamp, in a cathode ray tube, in a plasma display device or in a liquid crystal display (LCD). The material may also be used as a scintillator in an electromagnetic calorimeter, in a gamma ray camera, in a computed tomography scanner or in a laser. These uses are meant to be merely exemplary and not exhaustive.

EXAMPLES

Testing Procedures:

Treated and untreated SASOF phosphor powders were blended with a Mg-fluorogermanate:$Mn^{4+}$ red phosphor (MFG) and then dispersed into a two-part silicone (RTV-615, Momentive Performance Materials). This phosphor/silicone slurry was then poured into an Al plaque and cured at 85-100° C. for at least 30 minutes. After curing, the initial luminescence spectra of the SASOF/MFG blends were then measured under 405 nm excitation. These Al plaques were then placed into a high temperature, high humidity (HTHH) chamber. After exposure to HTHH conditions, the plaques were re-measured under 405 nm excitation and the spectra before and after HTHH exposure are compared.

Example 1

SASOF Phosphor Synthesis (Nominal composition: $(Sr_{0.895}Ca_{0.1}Ce_{0.005})_3Al_{0.6}Si_{0.4}O_{4.415}F_{0.585}$)

Starting materials:

| | |
|---|---|
| $SrCO_3$ (Aldrich) | 193.74 g |
| $CaCO_3$ (Aldrich) | 17.44 g |
| $CeO_2$ (Alfa Aesar) | 1.50 g |
| α-$Al_2O_3$ (Ceralox) | 17.76 g |
| CAB-O-SIL TS-610 (Fumed $SiO_2$) | 13.96 g |

The materials were dry-blended for four hours and fired at 1100/8 hours/air in an open alumina crucible. The resulting combined aluminate-silicate precursor is then blended with 29.745 g $SrF_2$ for 2 hours in a open alumina crucible. The phosphor cake was then broken up with a mortar and pestle and then milled in isopropanol until a median particle size of 16-20 μm was reached. After milling the phosphor was placed into a beaker with isopropanol and stirred with a magnetic stir bar. The stirring was then stopped and the larger particles settle to the bottom of the beaker and any fine particles are suspended in isopropanol are decanted. Additional isopropanol was added to make a slurry with the remaining phosphors. This slurry was passed through a 325 mesh screen and the solvent was filtered out. The filtrate containing the phosphor was then dried in air using a heat lamp. The SASOF phosphor powder was blended with a Mg-fluorogermanate:$Mn^{4+}$ red phosphor to result in the phosphor used as a control for HHTH testing.

Example 2

Treatment with Coating Precursors

Phosphors were reacted with silicate or phosphate precursors to create a barrier that separates the moisture sensitive phosphor from the atmosphere, thereby reducing or eliminating reactions between the phosphor and components of the atmosphere. Reaction of the phosphor with components in the atmosphere ($H_2O$ and/or possibly $CO_2$) may result in a decrease in both absorbance and quantum efficiency. Four different materials/precursors were used as coating materials for the SASOF phosphor (all samples were from the same SASOF batch): $Na_2SiO_3$, BN, $Si(OC_2H_5)_4$ (tetraethyl orthosilicate or TEOS), and submicron $SiO_2$.

Experimental conditions are summarized in Table I. The procedure for Coating #2 is here described in detail as an example.

$Na_2SiO_3$ (0.5 g) was dissolved in 50 g of ethylene glycol ($C_2H_6O_2$). The pH of the resulting solution was adjusted to 4.7 using $H_2SO_4$. The SASOF phosphor prepared in Example 1 was added to this solution, the pH was readjusted to 4.7, and this slurry was magnetically stirred for 90 min. Heating was applied during this stirring period. After 90 minutes, the solution was filtered out and the filtrate was washed with isopropanol. The filtrate was then dried in air using a heat lamp.

TABLE 1

| # | SASOF (g) | solvent | Solvent (g) | Coating Precursor | Precursor (g) | comments |
|---|---|---|---|---|---|---|
| 1 | 10 | Ethylene glycol | 50 | $Na_2SiO_3$ | 0.5 | 4 hr. stir |
| 2 | 10 | Ethylene glycol | 50 | $Na_2SiO_3$ | 0.5 | add $H_2SO_4$, pH = 4.7, 1.5 hr. stir |
| 3 | 6 | Isopropyl alocohol | 40 | BN | 0.24 | 60° C. stirred until IPA evap., ≈2 hr. |
| 4 | 6 | Ethanol/ $H_2O$ | 26/6 | TEOS | 3 | add $H_2SO_4$, pH = 3 |
| 5 | 5.5 | Isopropyl alocohol | 30 | $SiO_2$ (CAB-O-SIL ® TS-610) | 0.24 | pH = 6 |
| 6 | 5.5 | Isopropyl alocohol | 30 | $SiO_2$ (CAB-O-SIL ®) | 0.24 | pH = 10 |
| 7 | 5.5 | Isopropyl alocohol | 30 | $SiO_2$ (CAB-O-SIL ®) | 0.24 | pH = 3 |

After coating the phosphor, plaques of a mixture of the coated phosphor with a standard phosphor (MFG) that has good stability under high temperature and high humidity (HTHH) conditions were made and the initial emission spectra of these plaques were measured. These plaques were then placed in a chamber where they were exposed to 85% humidity at a temperature of 85° C. for 99.9 hours (the maximum amount of time allowed by our chamber). The emission spectra of each plaque was measured again, the initial spectra and spectra measured after the high temperature and high humidity (HTHH) were normalized to each other by the emission peak of the standard phosphor (at about 658 nm), and the area under each spectra from 420 nm to 635 nm was calculated. The ratio of the emission spectra area after/before the HTHH treatment is what is reported as % HTHH in Table 2. Each coated sample was run in duplicate, so the average of the two plaques for each sample is also shown. Also shown in Table II are the results for a second phosphor abbreviated as SAE which serves the purpose of a second control.

TABLE 2

| Coating Precursor | Coating # | Plaque | % HTHH | AVG % |
|---|---|---|---|---|
| None | SASOF | 1 (control) | 6.7 | |
| none | SASOF | 2 (control) | 9.8 | 8.25 |
| $Na_2SiO_3$ | I | 1 | 17.4 | |
| $Na_2SiO_3$ | I | 2 | 17.1 | 17.25 |
| $Na_2SiO_3$ | II | 1 | 21.3 | |
| $Na_2SiO_3$ | II | 2 | 21.7 | 21.5 |
| $Na_2SiO_3$ | II heat | 1 | 17.3 | |
| $Na_2SiO_3$ | II heat | 2 | 19.3 | 18.3 |
| BN | III | 1 | 9 | |
| BN | III | 2 | 9 | 9 |
| TEOS | IV | 1 | 30.9 | |
| TEOS | IV | 2 | 31.1 | 31 |
| $SiO_2$(pH = 6) | V | 1 | 8.6 | |
| $SiO_2$(pH = 6) | V | 2 | 8.8 | 8.7 |
| $SiO_2$(pH = 10) | VI | 1 | 9.3 | |
| $SiO_2$(pH = 10) | VI | 2 | 9.4 | 9.35 |
| $SiO_2$(pH = 3) | VII | 1 | 29.9 | |
| $SiO_2$(pH = 3) | VII | 2 | 29.5 | 29.7 |
| none | SAE | 1 | 89.7 | |
| none | SAE | 2 | 91.3 | 90.5 |

As shown in Table 2, the uncoated SASOF material showed a HTHH % of only 8.25% (meaning a degradation in radiance of 91.75% as a result of the HTHH exposure), and several of the coated materials show an improvement relative to the uncoated material.

Example 3

A second trial was carried out focusing on the best performing (#4) coating material from the first trial, (TEOS), as well as introducing a new coating material diammonium phosphate (DAP). The experimental conditions for the second trial coating experiments are summarized in Table 3. The procedure for treatment with DAP is described in detail as an example.

Materials

SASOF phosphor: 5 g $(NH_4)_2HPO_4$ (DAP): 33.0 g

Deionized $H_2O$ (DI $H_2O$): 250 mL

DAP was fully dissolved in room temperature DI $H_2O$ to given an approximately 1M solution of DAP. The SASOF phosphor was added to this solution and this slurry was magnetically stirred for 30 min. After 30 minutes, the solution was filtered out and the filtrate was washed with DI $H_2O$. The filtrate was then dried in air using a heat lamp.

TABLE 3

| Example # | SASOF mass (g) | Ethanol (mL) | TEOS (mL) | $H_2O$ (mL) | pH | Comment |
|---|---|---|---|---|---|---|
| 3.1 | 35 | 125 | 25 | 50 | 10.2 | No pH adjustment |
| 3.2 | 35 | 125 | 25 | 50 | 3 | Used $H_2SO_4$ |
| 3.3 | 6 | 29 | 4.4 | 1 | 3 | Low concentration water, used $H_2SO_4$ |
| 3.4 | 6 | 22 | 4.4 | 8.8 | 11 | used $NH_4OH$ |
| 3.5 | 6 | 20 | 4.4 | 20 | 3 | Used $H_2SO_4$ |
| 3.6 | 5 | 0 | 0 | 250 | — | 1M DAP(aq), 30 min. stir |

The plaques were made and measured in a similar fashion to the first trial, but the chamber conditions were changed to 80° C., 80% humidity for 72 hours. As shown in Table 3, these more moderate conditions resulted in the SAE samples showing a % HTHH of 98.6% as opposed to 90.5% for the first trial. Relative to the uncoated SASOF sample (radiance %=9.6%), Table 3 shows that the phosphor emission degradation upon exposure to HTHH was greatly decreased in the TEOS coated material. By controlling the pH and water content during the coating process, the best performing sample (attempt #4) showed only a 3.9% decrease in emission intensity (96.1% radiance). Also shown in Table 3, the DAP coating procedure resulted in good protection of the phosphor measuring a % HTHH of 91.9%. From the data in Table 3, it is evident that reduced degradation is not measured in samples that were treated using minimal water (sample 3) and samples that did not have a pH adjustment (sample 1).

Volume ratios of TEOS:ethanol:water typically ranged from 1:3:2 to 1:7:5. TEOS has a density of 0.94 g/mL so typically the TEOS amount used in these experiments was about 67% by weight of the phosphor. Significantly lower amounts of TEOS will result in incomplete coating of the phosphor particles (less than 5% TEOS) while excess of TEOS can be rinsed away with a suitable solvent such as isopropyl alcohol.

TABLE 4

| Material | Coating # | Sample | % HTHH | AVG |
|---|---|---|---|---|
| TEOS | II | 1 | 81.4 | |
| TEOS | II | 2 | 80.4 | 80.5 |
| TEOS | II | 3 | 79.8 | |
| TEOS | IV | 1 | 95.8 | |
| TEOS | IV | 2 | 96.2 | 96.1 |
| TEOS | IV | 3 | 96.2 | |
| TEOS | V | 1 | 94.2 | |
| TEOS | V | 2 | 93.8 | 93.9 |
| TEOS | V | 3 | 93.6 | |
| DAP | Example 3.6 | 1 | 92 | |
| DAP | Example 3.6 | 2 | 92.9 | 91.9 |
| DAP | Example 3.6 | 3 | 90.7 | |
| none | SAE | 1 | 98.4 | |
| none | SAE | 2 | 98.5 | 98.6 |
| none | SAE | 3 | 98.9 | |
| none | SASOF | | 8.9 | |
| none | SASOF | | 10.3 | 9.6% |
| none | SASOF | | 9.5 | |

Note:
Coatings I and III showed little improvement relative to uncoated sample.

Normalized emission spectra for the uncoated SASOF and TEOS coated SASOF samples both before and after the HTHH test were measured. A characteristic broad emission of the SASOF phosphor peaking at approximately 530 nm was observed in the coated material, but was absent after the HTHH exposure. SEM images of both uncoated and TEOS coated SASOF showed a dense coating on the phosphor particles.

Example 4

Aluminum and Magnesium Oxide/Hydroxide Coating of SASOF

General Procedure

In a typical solution-based coating process, uncoated SASOF is placed in a beaker containing an alcohol such as ethanol or isopropyl alcohol and possibly also some water. The suspension is usually sonicated and a dispersing agent such as Dispex® may be used to maximize dispersion of the phosphor in suspension. A metal halide (for example $AlCl_3$) or metal nitrate (for example $Al(NO_3)_3 \cdot xH_2O$) is used as the cation source and a water soluble material such as $NaHCO_3$, urea, KOH, NaOH, or $NH_4OH$ is used as the hydroxide source. The molar ratio of hydroxide/metal was typically stoichiometric ($OH^-/Al^{3+}=3$, $OH^-/Mg^{2+}=2$) but off stoichiometry ratios may also be used. The reactants are typically dissolved in a small amount of water. The most uniform coatings typically are formed when the reactants were added slowly (greater than about 5 minutes) to the suspension. The suspension may be heated during the coating process. In situations where the reactants were added too quickly (a few minutes or less), nuclei of metal hydroxide may form in addition to the reactants just coating the phosphor. After the reactants are added, the suspension is typically stirred for a period of time, then the coated phosphor is allowed to settle, the fines are decanted and the material is vacuum filtered. The coated material may be washed multiple times with water and/or alcohol, and then dried. A post coating anneal may be used to convert the hydroxide coating to an oxide coating.

Example 4-1

Alumina-Coated SASOF

SASOF (4 g)+80 mL of isopropyl alcohol+3 drops of dispersant (DISPEX®) were added to a 300 mL beaker, sonicated for 10 minutes and then magnetically stirred vigorously. $Al(NO_3)_3 \cdot 9H_2O$ (aq) (0.3M, 1.5 mL) was added dropwise to the suspension, then 20 mL of 0.13 M $NaHCO_3$ (aq) was titrated over a 45 minute period. During the $NaHCO_3$ titration, an additional 2 mL of 0.3M $Al(NO_3)_3 \cdot 9H_2O$ (aq) was added dropwise to the suspension. The suspension was stirred for 30 additional minutes, fines were decanted, the coated material was vacuum filtered, rinsed twice with about 15-20 mL of water and then twice with about 15-20 mL of isopropyl alcohol. The coated material was dried, and annealed at 200° C., where it was converted to a partly polycrystalline/amorphous coating of $Al_2O_3$ as $2Al(OH)_3 \rightarrow Al_2O_3 + 3H_2O$.

Example 4-2

Magnesium Oxide-Coated SASOF

SASOF (5 g) plus 75 mL IPA plus 3 drops of DISPEX® were added to a 300 mL beaker, sonicated for 10 minutes and then magnetically stirred vigorously. 0.163 g of $MgCl_2$ was dissolved in about 10 mL of deionized water and 0.206 g of urea was dissolved in 25 mL of deionized water. 5 mL of the $MgCl_2$ (aq) solution was added dropwise to the stirring suspension and then the urea solution was titrated over about 15 minutes. During the urea titration the remaining 5 mL of $MgCl_2$ (aq) solution was added dropwise. The suspension was then stirred for 3 hours, fines were decanted, the coated material was vacuum filtered, rinsed twice with about 20-25 mL of water and then twice with about 20-25 mL of isopropyl alcohol. The coated material was dried, and annealed at 400° C., where it was converted to a partly polycrystalline/amorphous coating via $Mg(OH)_2 \rightarrow MgO + H_2O$.

Example 5

Boron Nitride/Boron Oxide Coated SASOF

The SASOF phosphor is fired and milled down to size. Boric acid or another boron source, such as $B_2O_3$ or $Na_2B_4O_7$, is dry blended with the finished phosphor. The coated phosphor may be fired under $NH_3/N_2$ atmosphere, at temperatures between 800-1200° C. If desired, the firing may be done under an atmosphere not containing ammonia such that a boron oxide coating would be formed. By this method, milling for particle size reduction is done first and then the coating is applied without having to mill the material afterwards. This avoids milling after coating, and possible damage to the coating that might result in less protection of the phosphor from moisture. Typically 1-20 weight % boric acid is added relative to the finished phosphor. Table 5 shows that the 3% boric acid/6% boric acid coated material integrated emission intensity ratio after/before 72 hours of exposure to a temperature of 80° C., and a relative humidity of 80% degraded only 3/0.5% while the uncoated material degraded 39%. A thicker coat may better protect the phosphor from high humidity, but may also be accompanied by a decrease in quantum efficiency and absorbance. A trade off of HTHH protection Absorbance*QE is sometimes observed. XRD images of coated samples show a weak crystalline peak most likely resulting from the hexagonal phase of BN. It is also expected that amorphous forms of boron nitride and boron oxide are present but XRD only detects crystalline phases.

Table 5 shows the results from 72 hours of 80° C., 80% RH exposure of boron nitride/boron oxide coated SASOF relative to a magnesium hydroxide/oxide coated sample and alumina coated sample. Relative to the uncoated phosphor, improvements of QE*Abs.*HTHH of 34%, 39%, and 34% were measured for the boron nitride/oxide, magnesium hydroxide/oxide, and alumina coated phosphor.

TABLE 5

| sample ID | composition | % HTHH | QE/Abs. | QE* Abs. *HTHH |
|---|---|---|---|---|
| Example 1 | CONTROL: uncoated 10:40 | 61 | 103/76 | 0.71 |
| example 5 | 3% boric acid | 97 | 95/77 | 1.05 |
| Example 5 | 6% BA | 99.5 | 83/75 | 0.92 |
| example 4.2 | Mg(OH)2 | 100 | 98/76 | 1.1 |
| SAE | control | 96.6 | 100/70 | 1 |
| example 4.1 | alumina coat | 99 | 101/71 | 1.05 |

(72 hours at 80° C., 80% RH HTHH)

Example 6

Aluminum Phosphate and Magnesium Phosphate Coating of SASOF

General Procedure

In a typical solution-based coating process, uncoated SASOF is placed in a beaker containing an alcohol such as ethanol or isopropyl alcohol and possibly also some water. The suspension is usually sonicated and a dispersing agent such as DISPEX® may be used to maximize dispersion of the phosphor in suspension. A metal halide (for example $AlCl_3$) or metal nitrate (for example $Al(NO_3)_3 \cdot xH_2O$) is used as the cation source and a water soluble material such as such as $(NH_4)_3PO_4$, $NH_4H_2PO_4$, $(NH_4)_2HPO_4$ (diammonium hydrogen phosphate (DAP)), other ammonium polyphophates of the formula $[NH_4 PO_3]_n$, $Na_3PO_4$, $K_3PO_4$, was used as the phosphate source. The molar ratio of phosphate/metal was typically $PO_4^{3-}/Al^{3+}=1$ for aluminum phosphate coatings, and $PO_4^{3-}/Mg^{2+}=0.66$ for magnesium phosphate coatings. However, because of the polyphosphates that can form under various pH environments, molar ratios in the range of $0.5 \geq PO_4^{3-}/Al^{3+} \leq 3$ ratios may also be used for aluminum phosphate coatings and molar ratios of $0.33 \geq PO_4^{3-}/Mg^{2+} \leq 2$. The reactants are typically dissolved in a small amount of water. The most uniform coatings occurred when the reactants were added dropwise slowly (greater than about 5 minutes) to the suspension and the suspension may be heated during the coating process. In situations where the reactants were added too quickly (a few minutes or less) it was observed that new nuclei of metal phosphate formed in addition to the reactants just coating the phosphor. After the reactants were added, the suspension was typically stirred for a period of time, then the coated phosphor was allowed to settle, the fines were decanted and the material was vacuum filtered. The coated material may be washed multiple times with water and/or alcohol, and then dried. A post coating anneal may be used to convert the hydroxide coating to an oxide coating.

Example 6-1

Aluminum Phosphate-Coated SASOF

SASOF (8 g)+150 mL of isopropyl alcohol+3 drops of dispersant (DISPEX®) were added to a 300 mL beaker, sonicated for 10 minutes and then magnetically stirred vigorously. $Al(NO_3)_3 \cdot 9H_2O$ (aq) (0.554 g) was dissolved in 10 mL deionized water and 5 mL of the solution was added dropwise to the suspension. Next, 0.075 g of $(NH_4)_2HPO_4$ was dissolved in 20 mL of deionized water and was titrated over a 15 minute period. During the $(NH_4)_2HPO_4$ titration, the remaining 5 mL of $Al(NO_3)_3 \cdot 9H_2O$ (aq) was added dropwise to the suspension to maintain a pH between 5 and 7. The suspension was stirred for 30 additional minutes, fines were decanted, the coated material was vacuum filtered, rinsed twice with about 20 mL of water and then twice with about 20 mL of isopropyl alcohol. The coated material was dried, and annealed at 200° C. The results of a 140 hour exposure to 80 80° C., 80% RH are shown in table 6, At 8% $AlPO_4$ coating, it is apparent that the coating protects the phosphor quite well, but due to the reflective nature of the coating the measured absorbance begins to decrease due to the coating thickness. By decreasing the coating mass % to 3%, good moisture protection is measured without a significant decrease in absorbance. The metric of Abs.*QE*% HTHH was developed to balance moisture protection without reducing absorbance or QE of the material.

Example 6-2

Magnesium Phosphate-Coated SASOF

SASOF (8 g)+150 mL of isopropyl alcohol+3 drops of dispersant (DISPEX®) were added to a 300 mL beaker, sonicated for 10 minutes and then magnetically stirred vigorously. $MgCl_2$ (0.08 g) was dissolved in 10 mL of deionized water and 5 mL of the solution was added dropwise to the suspension. Next, 0.075 g of $(NH_4)_2HPO_4$ was dissolved in 20 mL of deionized water and was titrated over a 15 minute period. During the $(NH_4)_2HPO_4$ titration, the remaining 5 mL of MgCl2 (aq) was added dropwise to the suspension to maintain a pH between 8 and 10. The suspension was stirred for 30 additional minutes, fines were decanted, the coated material was vacuum filtered, rinsed twice with about 20 mL of water and then twice with about 20 mL of isopropyl alcohol. The coated material was dried, and annealed at 200° C. Table 6 shows that only a 3% decrease in emission intensity (97% HTHH) was measured after 140 hr. of exposure to 80° C., 80% RH.

TABLE 6

HTHH Test: 140 Hour Exposure to 80° C., 80% RH

| Sample ID | Composition | % HTHH | QE/Abs. | QE* Abs. *HTHH |
|---|---|---|---|---|
| CONTROL | uncoated 10:40 | 25 | 103/75 | 29 |
| Example 6.2 | 10% $Mg_3(PO_4)_2$ | 97 | 101/71 | 103 |
| Example 6.2 | 3% $Mg_3(PO_4)_2$ | 81 | 100/72 | 86 |
| Example 6.1 | 8% Al $PO_4$ | 97 | 101/64 | 93 |
| Example 6.1 | 3% Al $PO_4$ | 94 | 98/72 | 98 |
| SAE | SAE Control | 98 | 100/69 | 1 |
| Example 4.1 | alumina | 95 | 104/71 | 104 |
| Example 4.2 | Mg(OH)2 | 96 | 100/77 | 109 |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A color stable phosphor composition comprising particles of a phosphor of formula I, said particles having a coating composition disposed on surfaces thereof;

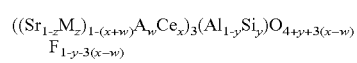

I wherein
the coating composition comprises a material selected from aluminum oxide, magnesium oxide, calcium oxide, barium oxide, strontium oxide, zinc oxide, aluminum hydroxide, magnesium hydroxide, calcium hydroxide, barium hydroxide, strontium hydroxide, zinc hydroxide, aluminum phosphate, magnesium phosphate, calcium phosphate, barium phosphate, strontium phosphate, and combinations thereof;
A is Li, Na, K, or Rb, or a combination thereof;
M is Ca, Ba, Mg, Zn, or a combination thereof; and
$0 < x \leq 0.10$, $0 \leq y \leq 0.5$, $0 \leq z \leq 0.5$, $0 \leq w \leq x$.

2. A color stable phosphor according to claim 1, wherein the coating composition comprises aluminum oxide, aluminum hydroxide, or a combination thereof.

3. A color stable phosphor according to claim 1, wherein the coating composition comprises magnesium oxide, magnesium hydroxide, or a combination thereof.

4. A color stable phosphor according to claim 1, wherein the coating composition comprises boron nitride, boron oxide, or a combination thereof.

5. A color stable phosphor according to claim 1, wherein the coating composition comprises aluminum phosphate.

6. A color stable phosphor according to claim 1, wherein the coating composition comprises magnesium phosphate.

7. A coated phosphor according to claim 1, wherein the phosphor of formula I is $((Sr_{1-z}M_z)_{1-2x}A_xCe_x)_3AlO_4F$.

8. A coated phosphor according to claim 1, wherein the phosphor of formula I is $((Sr_{1-z}M_z)_{1-x}Ce_x)_3(Al_{1-y}Si_y)O_{4+y+3}F_{1-y-3x}$.

9. A coated phosphor according to claim 1, wherein the phosphor of formula I is $(Sr_{0.98}Na_{0.01}Ce_{0.01})_3AlO_4F$; $(Sr_{0.98}, Na_{0.01}Ce_{0.01})(Al_{0.9}Si_{0.1})O_{4.1}F_{0.9}$; $(Sr_{0.98},Na_{0.01}Ce_{0.01})(Al_{0.8}Si_{0.2})O_{4.2}F_{0.8}$; $(Sr_{0.75}Ca_{0.23}Na_{0.01}Ce_{0.01})(Al_{0.75}Si_{0.25})O_{4.25}F_{0.75}$, $(Sr_{0.595}Ca_{0.4}Ce_{0.005})(Al_{0.6}Si_{0.4})O_{4.415}F_{0.585}$, or a combination thereof.

10. A color stable phosphor according to claim 1, wherein the phosphor of formula I is $(Sr_{0.895}Ca_{0.1}Ce_{0.005})_3Al_{0.6}Si_{0.4}O_{4.415}F_{0.585}$.

11. A method for preparing a color stable phosphor, said method comprising contacting a phosphor of formula I in particulate form with a coating precursor at an acidic or basic pH in a solvent comprising water;

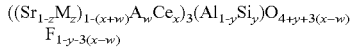     I wherein
the coating precursor is selected from tetraalkylothosilicates, fumed silica, alkali metal silicates, phosphates of formula $R_n(PO_4)_m$, and combinations thereof;
A is Li, Na, K, or Rb, or a combination thereof;
M is Ca, Ba, Mg, Zn, or a combination thereof;
$0 < x \leq 0.10$, $0 \leq y \leq 0.5$, $0 \leq z \leq 0.5$, $0 \leq w \leq x$;
R is hydrogen, $NH_4$, Li, Na, K, Rb, or a combination thereof;
with the proviso that when the coating precursor is fumed silica, pH is less than or equal to about 4.

12. A method according to claim 11, wherein the coating precursor is tetraethylothosilicate or $NaSiO_3$.

13. A method according to claim 11, wherein pH is less than or equal to about 5 or greater than or equal to about 9.

14. A method according to claim 11, wherein the solvent additionally comprises at least one alcoholic solvent selected from methanol, ethanol, propanol, ethylene glycol, propylene glycol, or a combination thereof.

15. A method according to claim 11, wherein a temperature at which the phosphor of formula I is contacted with the coating precursor is less than about 30° C.

16. A color stable phosphor produced according to the method of claim 11.

17. An LED lamp comprising:
a light source configured to emit radiation with a peak intensity at a wavelength between about 250 nm and about 550 nm; and
a phosphor composition configured to be radiationally coupled to the light source, and comprising particles of a phosphor of formula I, said particles having a coating composition disposed on surfaces thereof;

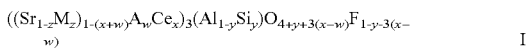    I wherein
the coating composition comprises aluminum oxide, magnesium oxide, calcium oxide, barium oxide, strontium oxide, zinc oxide, aluminum hydroxide, magnesium hydroxide, calcium hydroxide, barium hydroxide, strontium hydroxide, zinc hydroxide, aluminum phosphate, magnesium phosphate, calcium phosphate, strontium phosphate, barium phosphate, silica-containing material derived from a precursor selected from tetraalkylothosilicates, fumed silica, alkali metal silicates, or a combination thereof; and
A is $NH_4$, Li, Na, K, or Rb, or a combination thereof;
M is Ca, Ba, Mg, Zn, or a combination thereof; and
$0 < x \leq 0.10$, $0 \leq y \leq 0.5$, $0 \leq z \leq 0.5$, $0 \leq w \leq x$.

18. An LED lamp according to claim 17, wherein the phosphor composition comprises one or more additional phosphors.

19. An LED lamp according to claim 17, wherein the coating composition comprises aluminum oxide, aluminum hydroxide, or a combination thereof.

20. An LED lamp according to claim 17, wherein the coating composition comprises magnesium oxide, magnesium hydroxide, or a combination thereof.

21. An LED lamp according to claim 17, wherein the coating composition comprises boron nitride, boron oxide, or a combination thereof.

22. An LED lamp according to claim 17, wherein the coating composition comprises aluminum phosphate.

23. An LED lamp according to claim 17, wherein the coating composition comprises magnesium phosphate.

24. An LED lamp according to claim 17, wherein the coating precursor is tetraethylothosilicate or $NaSiO_3$.

* * * * *

UNITED STATES PATENT AND TRADEMARK OFFICE
CERTIFICATE OF CORRECTION

PATENT NO. : 8,593,062 B2  
APPLICATION NO. : 13/080099  
DATED : November 26, 2013  
INVENTOR(S) : Murphy et al.

Page 1 of 2

It is certified that error appears in the above-identified patent and that said Letters Patent is hereby corrected as shown below:

On the Title Page, in Item (57), under "ABSTRACT", in Column 2, Line 20, delete "$0 \leq x \leq x$." and insert -- $0 \leq w \leq x$. --, therefor.

IN THE SPECIFICATION:

In Column 1, Line 25, delete "have have begun" and insert -- have begun --, therefor.

In Column 2, Lines 25-26, delete "tetraalkylothosilicates," and insert -- tetraalkylorthosilicates, --, therefor.

In Column 4, Lines 44-45, delete "$(Sr_{0.98}Na_{0.01}Ce_{0.01})(Al_{0.9}Si_{0.1})O_{4.1}F_{0.9}$; $(Sr_{0.98}Na_{0.01}Ce_{0.01})(Al_{0.8}Si_{0.2})O_{4.2}F_{0.8}$;" and insert -- $(Sr_{0.98},Na_{0.01}Ce_{0.01})(Al_{0.9}Si_{0.1})O_{4.1}F_{0.9}$; $(Sr_{0.98},Na_{0.01}Ce_{0.01})(Al_{0.8}Si_{0.2})O_{4.2}F_{0.8}$; --, therefor.

In Column 4, Line 47, delete "$(Sr_{0.595}Ca_{0.4}Ce_{0.05})(Al_{0.6}Si_{0.4})O_{4.415}F_{0.585}$," and insert -- $(Sr_{0.595}Ca_{0.4}Ce_{0.005})(Al_{0.6}Si_{0.4})O_{4.415}F_{0.585}$, --, therefor.

In Column 4, Line 65, delete "tetraalkylothosilicates," and insert -- tetraalkylorthosilicates, --, therefor.

In Column 7, Line 1, delete "covert" and insert -- convert --, therefor.

In Column 8, Line 26, delete "a open" and insert -- an open --, therefor.

In Column 9, in Table 1, under "solvent", Line 6, delete "alocohol" and insert -- alcohol --, therefor.

In Column 9, in Table 1, under "solvent", Line 10, delete "alocohol" and insert -- alcohol --, therefor.

Signed and Sealed this  
Tenth Day of February, 2015

Michelle K. Lee  
*Deputy Director of the United States Patent and Trademark Office*

CERTIFICATE OF CORRECTION (continued)

U.S. Pat. No. 8,593,062 B2

In Column 9, in Table 1, under "solvent", Line 12, delete "alocohol" and insert -- alcohol --, therefor.

In Column 9, in Table 1, under "solvent", Line 14, delete "alocohol" and insert -- alcohol --, therefor.

In Column 12, Line 2, delete "Al(NO$_3$)3*9H2O" and insert -- Al(NO$_3$)$_3$*9H$_2$O --, therefor.

In Column 13, in Table 5, under "composition", Line 5, delete "Mg(OH)2" and insert -- Mg(OH)$_2$ --, therefor.

In Column 13, Line 31, delete "polyphophates" and insert -- polyphosphates --, therefor.

In Column 14, Line 7, delete "80 80°C.," and insert -- 80°C., --, therefor.

In Column 14, Line 31, delete "MgCl2" and insert -- MgCl$_2$ --, therefor.

In Column 14, in Table 6, under "Composition", Line 8, delete "Mg(OH)2" and insert -- Mg(OH)$_2$ --, therefor.

IN THE CLAIMS:

In Column 15, Line 30, in Claim 8, delete "O$_{4+y+3}$F$_{1-y-3x}$." and insert -- O$_{4+y+3x}$F$_{1-y-3x}$. --, therefor.

In Column 15, Lines 48-49, in Claim 11, delete "tetraalkylothosilicates," and insert -- tetraalkylorthosilicates, --, therefor.

In Column 16, Line 2, in Claim 12, delete "tetraethylothosilicate" and insert -- tetraethylorthosilicate --, therefor.

In Column 16, Line 33, in Claim 17, delete "tetraalkylothosilicates," and insert -- tetraalkylorthosilicates, --, therefor.

In Column 16, Line 55, in Claim 24, delete "tetraethylothosilicate" and insert -- tetraethylorthosilicate --, therefor.